(12) United States Patent
Cho

(10) Patent No.: US 9,665,598 B2
(45) Date of Patent: May 30, 2017

(54) METHOD AND APPARATUS FOR STORING IMAGE FILE IN MOBILE TERMINAL

(75) Inventor: Seung-Hwa Cho, Busan Metropolian (KR)

(73) Assignee: Samsung Electronics Co., Ltd., Suwon-si (KR)

(*) Notice: Subject to any disclaimer, the term of this patent is extended or adjusted under 35 U.S.C. 154(b) by 1013 days.

(21) Appl. No.: 11/769,233

(22) Filed: Jun. 27, 2007

(65) Prior Publication Data

US 2008/0146274 A1    Jun. 19, 2008

(30) Foreign Application Priority Data

Dec. 18, 2006  (KR) .................. 10-2006-0129541

(51) Int. Cl.
| | |
|---|---|
| *G06F 17/30* | (2006.01) |
| *H04M 1/2745* | (2006.01) |
| *H04M 1/57* | (2006.01) |
| *H04W 8/18* | (2009.01) |

(52) U.S. Cl.
CPC .. *G06F 17/30265* (2013.01); *H04M 1/27455* (2013.01); *H04M 1/274516* (2013.01); *H04M 1/274533* (2013.01); *H04M 1/576* (2013.01); *H04M 2250/52* (2013.01); *H04W 8/18* (2013.01)

(58) Field of Classification Search
CPC ............ G06F 17/30265; H04M 1/576; H04M 1/274516; H04M 2250/52; H04M 1/27455; H04M 1/274533; H04W 8/18
USPC ...... 455/412.1, 550.1, 556, 556.1, 415, 566; 348/14.02–14.05, 231.99, 333.01; 379/355.01, 355.09; 382/118, 306; 707/104.1, 205, 737, 758, 796, 821–831
See application file for complete search history.

(56) References Cited

U.S. PATENT DOCUMENTS

| | | | |
|---|---|---|---|
| 7,118,032 | B2 | 10/2006 | Elliot et al. |
| 2001/0041056 | A1* | 11/2001 | Tanaka et al. .................. 386/95 |
| 2003/0236104 | A1* | 12/2003 | Lin ............................ 455/556.1 |
| 2004/0008906 | A1* | 1/2004 | Webb ................. H04N 5/23219 |
| | | | 382/306 |
| 2004/0207722 | A1* | 10/2004 | Koyama et al. ........... 348/14.02 |
| 2005/0041840 | A1* | 2/2005 | Lo .................................. 382/118 |
| 2005/0231632 | A1* | 10/2005 | Sekikawa et al. ............ 348/370 |
| 2005/0265578 | A1* | 12/2005 | Kim ............................. 382/102 |
| 2005/0280502 | A1 | 12/2005 | Bell |
| 2007/0027911 | A1* | 2/2007 | Hakala et al. ............. 707/104.1 |

FOREIGN PATENT DOCUMENTS

| | | |
|---|---|---|
| JP | 11205761 | 7/1999 |
| KR | 1020040023235 | 3/2004 |
| KR | 1020050060628 | 6/2005 |

(Continued)

*Primary Examiner* — Dinh P Nguyen

(74) *Attorney, Agent, or Firm* — H.C. Park & Associates, PLC

(57) ABSTRACT

A method and apparatus for storing an image file in a mobile terminal using a file name automatically generated when an image that matches an input image file is already stored in a phone book are provided. The method includes comparing an input image file with phone book image files that correspond to contacts stored in a phone book, and storing the input image file using a contact name corresponding to a matching phone book image file if a phone book image file matches the input image file.

12 Claims, 10 Drawing Sheets

(56) References Cited

FOREIGN PATENT DOCUMENTS

| | | |
|---|---|---|
| KR | 1020050101162 | 10/2005 |
| KR | 1020060035198 | 4/2006 |
| KR | 1020060054540 | 5/2006 |

\* cited by examiner

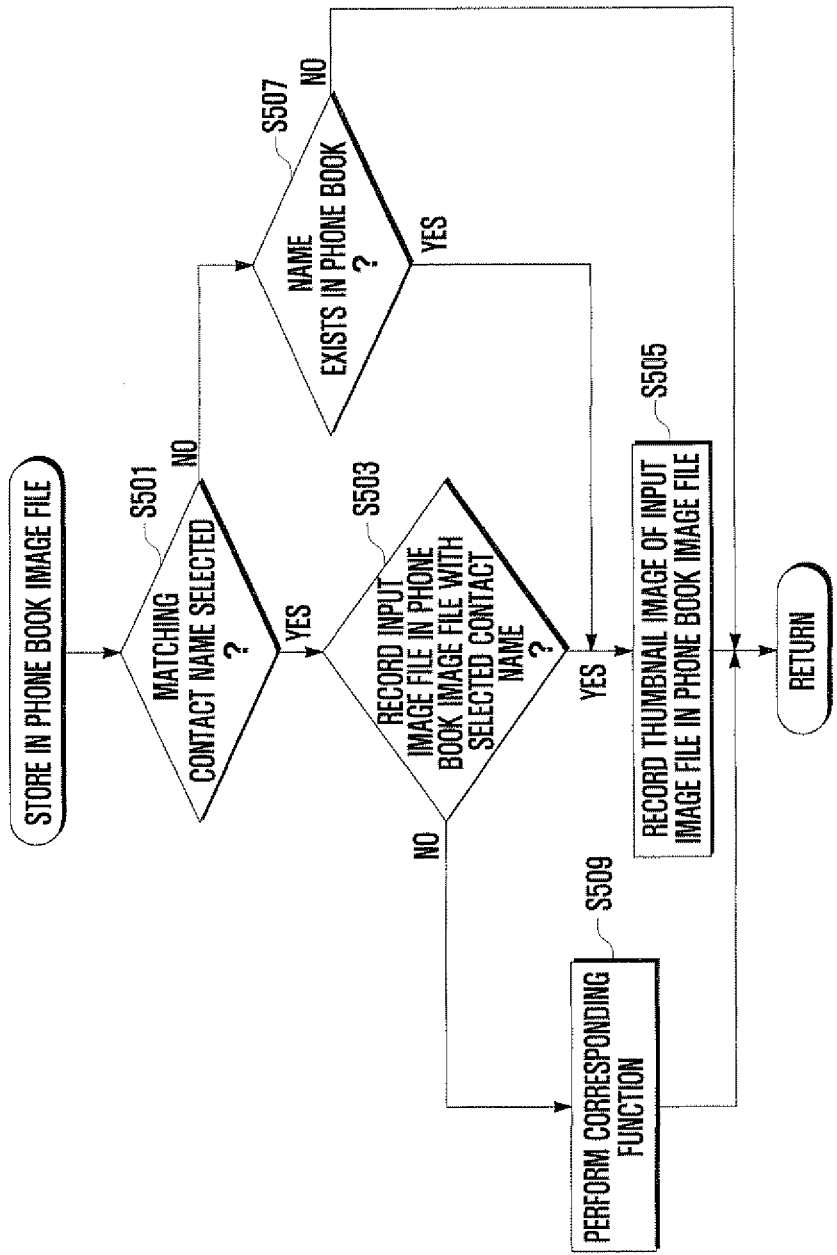

METHOD AND APPARATUS FOR STORING IMAGE FILE IN MOBILE TERMINAL

CROSS REFERENCE TO RELATED APPLICATION

This application claims priority from and the benefit of Korean Patent Application No. 10-2006-0129541, filed on Dec. 18, 2006, which is hereby incorporated by reference for all purposes as if fully set forth herein.

BACKGROUND OF THE INVENTION

Field of the Invention

The present invention relates to a method and apparatus for storing an image file in a mobile terminal, and more particularly, to a method and apparatus for storing an image file in a mobile terminal using a file name automatically generated when an image that matches an input image file has been stored in a phone book.

Discussion of the Background

In general, mobile terminals have developed from simple tools for communication into complex devices with various multimedia functions including a camera function. A mobile terminal with an embedded camera enables a user to store an image taken by the camera using a name input by the user or automatically created by the mobile terminal. Typically, a random name for the image file is automatically generated in the mobile terminal. The random name may include a character string such as 'photo' or 'moving image' and a number (for example, 'photo1', 'photo2', 'moving image1', or 'moving image2'). The name of the image file may also be edited by the user while it is being saved in the mobile terminal. However, because the user may not recognize the contents of the image if a random name is used, the user may directly create and store a name for an image.

As the number of images taken by a camera and hence, the number of images to be saved, increases, it may become cumbersome to create names for all of the image files. For example, if several pictures of the same person or object are taken, the user may create a different name for each picture in order to store them in a manner that permits easy identification and retrieval.

A camera-embedded mobile terminal may also have a phone book in which images are stored. This phone book function enables users to store contact information, such as a phone number, as well as an image file associated with the phone number in the phone book, thus providing greater convenience for users.

However, if a user desires to modify an image file stored in the phone book, they may need to record an image file in a photo album and retrieve the image file from the photo album for registration. That is, the user may have to go through the above process to replace the previously stored image file with the most recent image, thus inconveniencing the user.

SUMMARY OF THE INVENTION

The present invention provides a method and apparatus for storing an image file in a mobile terminal that may enable storage of an input image file using a contact name stored in a phone book.

The present invention also provides a method and apparatus for storing an image file in a mobile terminal that may enable a user to easily update an image file stored in a phone book with an input image file.

Additional features of the invention will be set forth in the description which follows, and in part will be apparent from the description, or may be learned by practice of the invention.

The present invention discloses a method for storing an image file in a mobile terminal, including comparing an input image file with phone book image files that correspond to contact names stored in a phone book and storing the input image file using a contact name corresponding to the matching phone book image file if a phone book image file matches the input image file.

The present invention also discloses a method for storing an image file in a mobile terminal, including comparing an input image file with phone book image files that correspond to contact names stored in a phone book and replacing the matching phone book image file with the input image file and storing the input image file if a phone book image file matches the input image file.

The present invention also discloses an apparatus to store an image file in a mobile terminal, including an image input unit to input an image file containing a facial region, a memory unit including a phone book to store image files, and a controller to extract the facial region from the input image file, compare the input image file with all image files stored in the phone book based on the extracted facial region, and check whether a matching image file corresponding to the image file exists in the phone book.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention, and together with the description serve to explain the principles of the invention.

FIG. 5 is a flowchart showing steps according to the method of FIG. 2.

DETAILED DESCRIPTION OF THE ILLUSTRATED EMBODIMENTS

Figure 1:
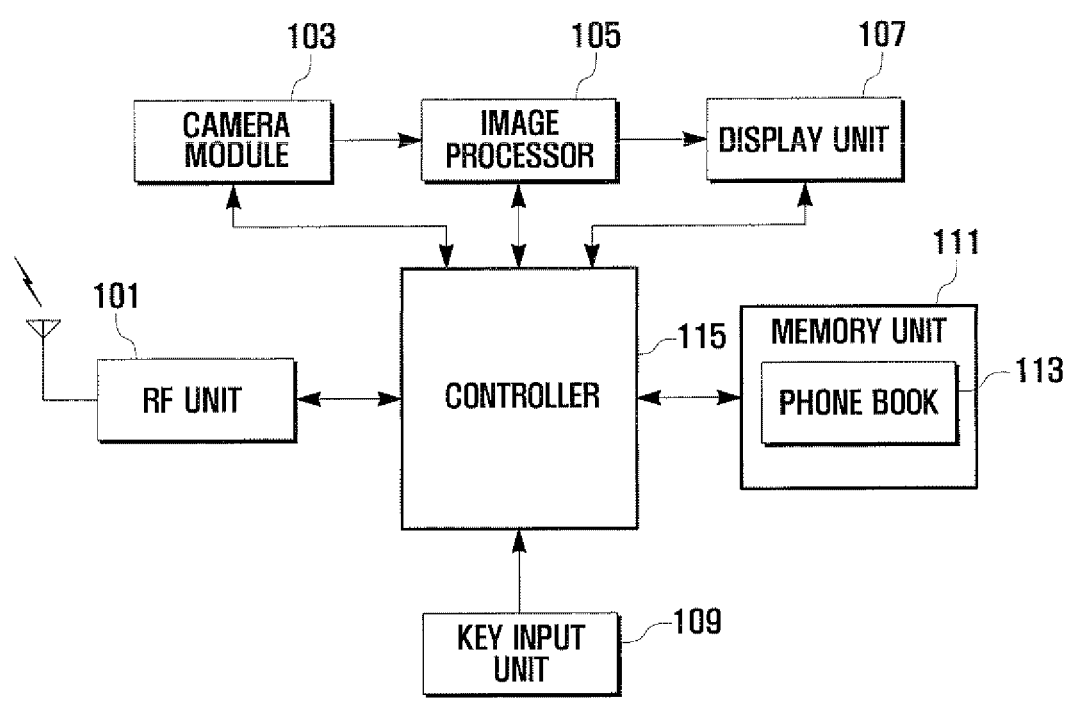
FIG. 1 is a schematic block diagram showing a configuration of a mobile terminal for storing an image file according to an exemplary embodiment of the present invention.

The invention is described more fully hereinafter with reference to the accompanying drawings, in which embodiments of the invention are shown. This invention may, however, be embodied in many different forms and should not be construed as limited to the embodiments set forth herein. Rather, these embodiments are provided so that this disclosure is thorough, and will fully convey the scope of the invention to those skilled in the art. In the drawings, the size and relative sizes of layers and regions may be exaggerated for clarity. Like reference numerals in the drawings denote like elements.

In the exemplary embodiments described below, "image recognition" refers to a technique that identifies the type and quantity of objects in an image. This technique enables a greater degree of recognition of images by comparing and analyzing segmented regions and extracting features from the images. In the exemplary embodiments below, a face recognition technique that enables recognition of a person appearing in an input image by their face may be used.

A "phone book image file" refers to an image file that may be recorded upon registration of contact information (phone number and name) in the phone book. The phone book image file may be stored using a contact name corresponding to a photo album stored in a memory unit, or to a thumbnail image. Further, when a contact is selected from the phone book, phone book information and the thumbnail image associated with the contact may be displayed together with an image file stored in a corresponding photo album, upon making or receiving a call.

Although, for convenience of explanation, a mobile terminal is herein used as a terminal according to an exemplary embodiment of the present invention, the present invention may apply to any type of information and communication device that can provide convenience for users, including a mobile phone, a wired/wireless phone, a Personal Digital Assistant (PDA), a Smart Phone, an audio device, an MP3 player, a notebook, a personal computer, and applications thereof.

FIG. 1 is a schematic block diagram showing a configuration of a mobile terminal for storing an image file according to an exemplary embodiment of the present invention.

Referring to FIG. 1, the mobile terminal according to the present exemplary embodiment has a typical configuration including a radio frequency (RF) unit 101, a camera module 103, an image processor 105, a display unit 107, a key input unit 109, a memory unit 111, and a controller 115.

The RF unit 101 performs wireless communication of the mobile terminal. The RF unit 101 includes an RF transmitter that up-converts the frequency of a signal being transmitted and amplifies the signal, and an RF receiver that low-noise amplifies a received signal and down-converts its frequency.

The camera module 103 includes a camera sensor that captures an image and converts the resulting optical signal into an electrical signal and a signal processor that converts an analog image signal output from the camera sensor to digital data.

The image processor 105 generates screen data for displaying an image signal output from the camera module 103. More specifically, the image processor 105 outputs frame image data obtained by dividing an image signal received from the camera module 103 into frames to match the display characteristics and size of the display unit 107. The image processor 105 also includes an image codec to compress the frame image data to be displayed on the display unit 107 using a predetermined compression technique and to decompress compressed image data into original image data.

The display unit 107 displays image data output from the image processor 105 on a screen. The display unit 107 may be a liquid crystal display (LCD). When the LCD is implemented using touch screen technology, the screen of the display unit 107 may function as an input unit. When an image file is input from the camera module 103, according to an exemplary embodiment of the present invention, and a phone book image file that matches the input image file exists, the display unit 107 displays a contact name corresponding to the phone book image file.

The key input unit 109 receives user input signals to control the mobile terminal. According to exemplary embodiments of the present invention, the key input unit 109 receives user input signals necessary to capture images through the camera module 103, to store the images, and to create a name of an image file obtained from the camera module 103.

The memory unit 111 includes program memory to store programs to control the general operations of the mobile terminal and a program to store an image file using an image recognition technique according to exemplary embodiments of the present invention, and data memory to temporarily store data generated while executing the programs.

The memory unit 111 includes a phone book 113 and a photo album. The phone book 113 contains a name and a phone number of each contact and a thumbnail image for a phone book image file used as an image file of a contact. The photo album is memory to store image files input to the mobile terminal, such as image files from the camera module 103 and image files received through the RF unit 101. The photo album may also contain phone book image files.

The controller 115 controls the overall operation of the mobile terminal. For example, the controller 115 controls a function to store an image file using an image recognition technique.

The controller 115 also controls the recognition of an image in an input image file. Image recognition is used to identify and obtain a facial image from an image file input through an image input device such as the camera module 103. The image recognition technique may be performed using technologies presented in Korean Patent Publication No. 10-2006-0054540 ("Face recognition method and apparatus"), Korean Patent Publication No. 10-2005-0060628 ("Face recognition method and method for searching for and displaying a person's image employing the same"), and Korean Patent Laid-open Publication No. 10-2006-0035198 ("Camera automatic zooming system and method using face recognition technique and mobile communication terminal having the same system"), which are all hereby fully incorporated by reference. Further, the image recognition technique may be performed using technologies presented in U.S. Pat. No. 7,118,032 ("Portable transaction terminal having an image recognition system") and U.S. Patent Publication No. 2005/0041840 ("Mobile phone with an image recognition function).

As an example, an image recognition method using the face recognition method and apparatus (Korean Patent No. 10-0608595) is described here in detail. According to the image recognition method, an image receiver receives an image to be recognized and transforms the image into digital pixel values. A facial localizer extracts a facial region from the digital pixel values and then a predetermined quantity of feature points that are to be subjected to Gabor filtering. A Gabor filter unit applies a set of Gabor filters with a plurality of orientations and frequencies to each of the facial feature points in order to obtain responses. The responses are represented by a Gabor-filtered vector, which may be a 1-D vector or an array. The Gabor-filtered vector is then provided to a determination unit of a binary classifier. The determination unit applies the binary determination criterion provided by a training unit to the Gabor-filtered vector provided by the Gabor filter unit and determines whether an input facial image belongs to the same person. In this exemplary embodiment of the present invention, the controller 115 recognizes and extracts a facial image from an input image file and compares the extracted facial image with each phone book image file stored in the phone book 113. If a phone book image file that matches the input image file exists within the phone book 113, the controller 115 automatically creates a contact name related to the phone book image file as the name of the input image file for storage. The name of the input image file may contain a number in addition to the name of the image file so that the input image file name may be distinguished from the already existing image file name.

If no phone book image file that matches the input image file exists within the phone book 113, the controller 115 automatically creates the name of the input image file. Alternatively, if three persons appear in an input image file and only a contact name "Cheol-su" corresponding to one of the three persons exists, the input image file can be automatically named with "Cheol-su & two others".

Figure 2:
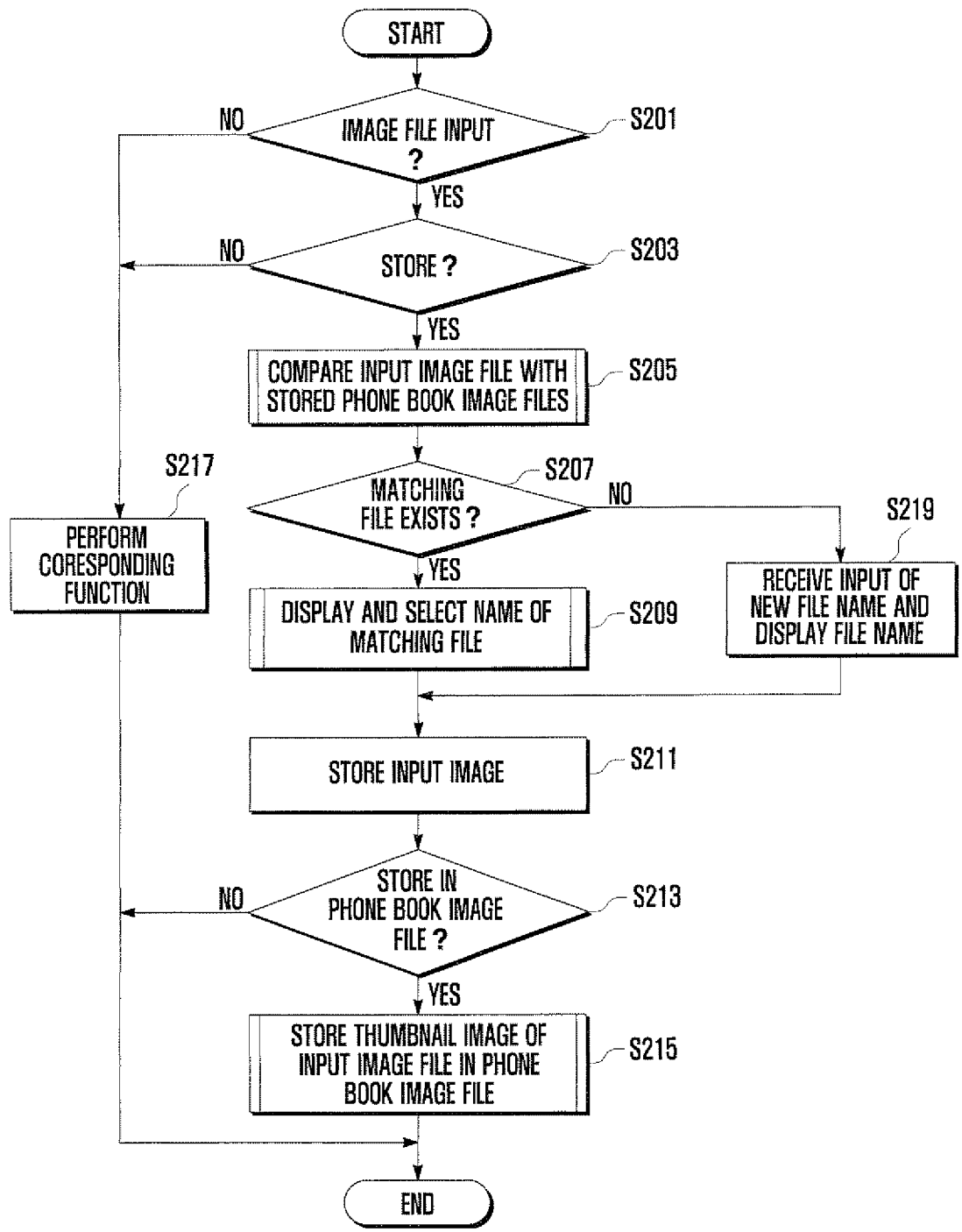
FIG. 2 is a flowchart showing a method for storing an image file in a mobile terminal according to an exemplary embodiment of the present invention.
Figure 3:
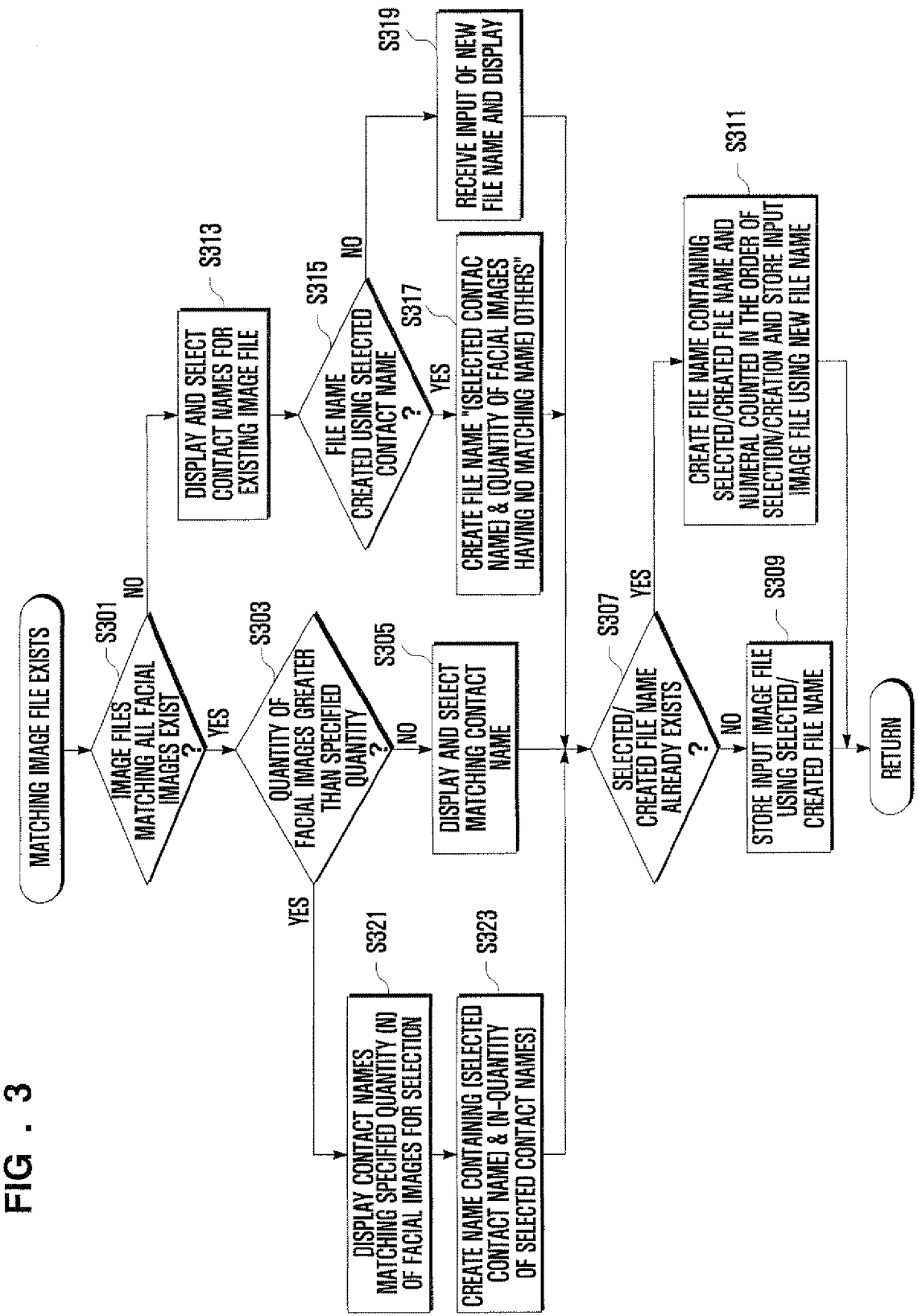
FIG. 3 is a flowchart showing steps according to the method of FIG. 2.

A method for storing an image file in a mobile terminal according to an exemplary embodiment of the present invention is described in detail with reference to FIG. 1, FIG. 2, FIG. 3, and FIG. 4. FIG. 2 is a flowchart showing a method for storing an image file in a mobile terminal according to an exemplary embodiment of the present invention, FIG. 3 is a flowchart showing steps according to the method of FIG. 2. FIG. 4A, FIG. 4B, FIG. 4C, FIG. 4D, FIG. 4E, FIG. 4F, FIG. 4G, FIG. 4H, and FIG. 4I show screen examples of a mobile terminal performing the steps shown in FIG. 3.

Figure 4A:
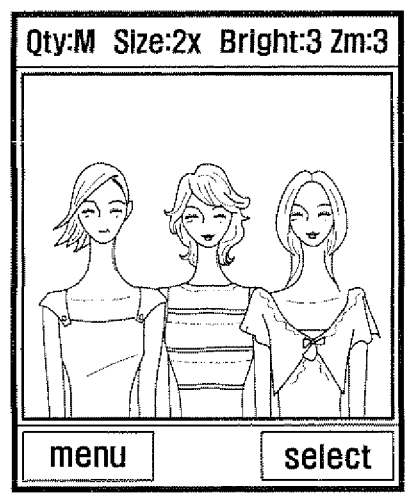
FIG. 4A, FIG. 4B, FIG. 4C, FIG. 4D, FIG. 4E, FIG. 4F, FIG. 4G, FIG. 4H, and FIG. 4I show screen examples of a mobile terminal performing the steps shown in FIG. 3.

Referring to FIG. 2, the controller 115 checks whether an image file is input (S201). The image file may be input through the camera module 103 or a mobile communication network. In the present exemplary embodiment, the image file is received through the camera module 103. The image processor 105 then adjusts the size and color of the input image file to match the size and characteristics of the display unit 107. The display unit 107 displays an image output from the image processor 105. FIG. 4A shows an example in which a preview image output from the image processor 105 is displayed on the display unit 107. Although three persons appear in the image file of this example, the number of persons appearing therein may vary. If an image file is not input in step S201, the controller 115 performs a function corresponding to a user's request (S217).

If an image file is input at step S201, the controller 115 checks whether a user wants to store the input image file (S203). That is, when the image file is input through the camera module 103, the user may choose to save the input image file or not. If there is no signal to store the input image file, the controller 115 performs a function corresponding to the user's request (S217), i.e. cancels the input of the image file.

If a signal instructing the storage of the input image file is input at step S203, the controller 115 compares the input image file with each image file stored in the phone book 113 (S205). The comparison step may be performed by extracting a facial image and feature points from the input image file and comparing the input image file with each phone book image file based on the extracted facial image and feature points.

The controller 115 determines whether a phone book image file that matches the input image file exists in the phone book 113 (S207) by comparing the input image file with each of the phone book files at step S205.

Figure 4B:
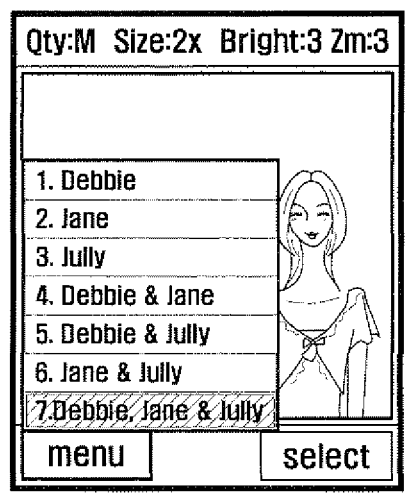
Figure 4C:
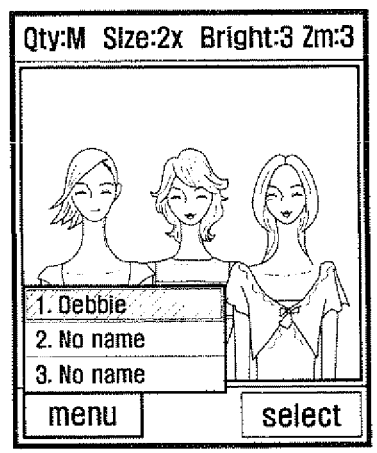
Figure 4D:
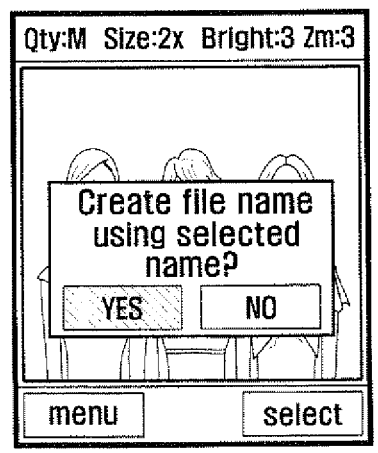
Figure 4E:
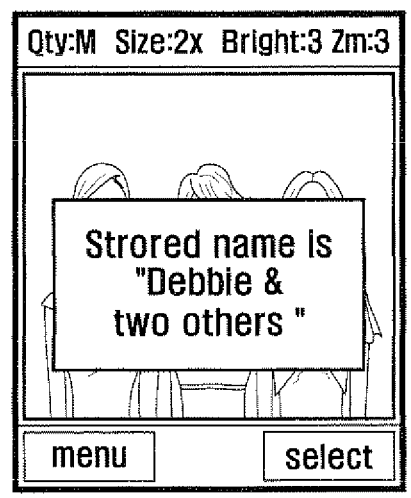
Figure 4F:
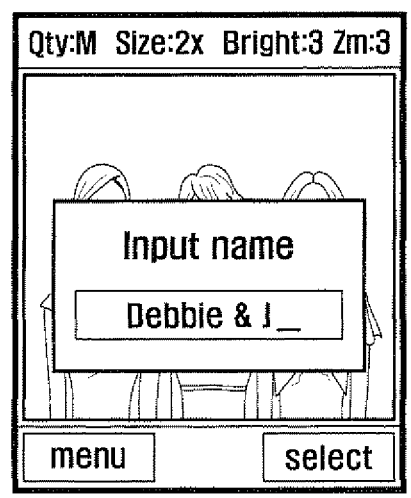

If no phone book image file matching the input image file exists in the phone book 113, the controller 115 receives a new file name from the user and displays the received file name (S219). FIG. 4F shows a screen example showing the step of receiving an input of the new file name. As shown in FIG. 4F, if no matching phone book image file exists, the controller 115 controls the display unit 107 to display a window that enables the user to enter a new file name.

If a phone book image file that matches the input image file exists at step S207, the controller 115 controls the display unit 107 to display contact names corresponding to the phone book image file, and the user selects a desired contact name among the displayed contact names through the key input unit 109 (S209). FIG. 4B shows a screen example of the display unit 107 on which contact names corresponding to a phone book image file matching the input image file are displayed. Upon viewing this screen, the user may select a desired contact name through the key input unit 109. As shown in FIG. 4B, if a phone book image file matching an image file containing facial images of three persons exists, contact names corresponding to the phone book image file are displayed and a desired contact name is selected. Step S209 is described in detail with reference to FIG. 3, FIG. 4A, FIG. 4B, FIG. 4C, FIG. 4D, FIG. 4E, FIG. 4F, FIG. 4G, FIG. 4H, and FIG. 4I as follows.

Case 1: Phone Book Image Files Match all of the Extracted Facial Images and the Number of the Extracted Facial Images is Less than or Equal to a Specified Number Referring to FIG. 3, if a matching phone book image file exists at step S207, the controller 115 checks whether phone book image files matching all of the facial images extracted at step S205 exist (S301). One or a plurality of facial images may be extracted from the image file input through the camera module 103. If a plurality of facial images are extracted from the input image file, the controller 115 checks whether phone book image files match each and all of the extracted plurality of facial images. For example, three facial images may be extracted from an image file containing images of three persons, as shown in FIG. 4A. The controller 115 checks whether contact names corresponding to all three of the extracted facial images exist.

If phone book files match all of the extracted facial images at step S301, the controller 115 checks whether the number of extracted facial images is greater than a specified quantity (S303). In the present exemplary embodiment, the specified quantity is set to 3. That is, the controller 115 checks whether the number of extracted facial images is greater than 3. The specified number may be set together with a function for storing an image file.

If the number of extracted facial images is less than or equal to 3, the controller 115 controls the display unit 107 to display contact names corresponding to the extracted facial image or images and requests the user to select a desired contact name through the key input unit 109 (S305). FIG. 4B shows an example of a screen on which three facial images are extracted from the input image file, and contact names corresponding to phone book image files matching the three facial images are displayed. As shown in FIG. 4B, if phone book image files match all of the three facial images, contact names corresponding to the matching phone book image files are displayed on the display unit 107. The contact names displayed may include the names of each person, names containing two persons' names, and a name containing all three persons' names. Alternatively, the contact names may be automatically set within the mobile terminal or directly set by the user. The controller 115 requests the user to select a desired name among the displayed contact names through the key input unit 109.

Thereafter, the controller 115 checks whether the selected contact name already exists as an image file name (S307). If the selected image file name already exists, the controller 115 creates a new file name containing the selected contact name together with a numeric sequence counted in the order of previous selection of the contact name as the file name of the input image file, and controls the memory unit 111 to store the input image file using the created file name (S311). That is, the controller 115 counts a number in the order that the contact name is selected and adds a consecutive number to the contact name to create a new file name for the input image file. For example, it is assumed that a facial image corresponding to a contact name 'Debbie' is contained in the input image file and the selected contact name is 'Debbie'. If two image files named 'Debbie' have already been stored in the memory unit 111, the controller 115 may create a file name 'Debbie3' at step S311.

If, however, the selected contact name does not exist at S307, the controller 115 stores the input image file using the selected contact name (S309).

Case 2: Phone Book Image Files Match Some of the Extracted Facial Images

If phone book image files matching only some of the extracted facial images exist at step S301, the controller 115 controls the display unit 107 to display contact names associated with the existing phone book image files and requests that the user select a desired name through the key input unit 109 (S313). FIG. 4C shows an example of a screen displayed when contact names correspond to only some of the extracted facial images. More specifically, FIG. 4C shows an example of a screen that displays an input image file containing three facial images, and a contact name corresponding to only one of the three facial images. As shown in FIG. 4C, if a contact name corresponds to one of the three facial images, a desired name is selected.

The controller 115 then checks whether to create a file name using the selected contact name (S315). FIG. 4D shows an example of a screen that displays a window asking the user whether to create a file name using the selected contact name.

If the user selects "No", the controller 115 receives a user input of a new file name and controls the display unit 107 to display the input file name (S319). FIG. 4F shows a screen to receive an input of the new file name.

If the user selects "Yes", the controller 115 creates a file name, "(selected contact name) & (number of facial images having no matching contact name) others", as the name of the input image file (S317). FIG. 4E shows a screen indicating the creation of a file name using the selected contact name. As shown in FIG. 4E, a file name "Debbie & two others" is created using the contact name selected at step S313 and the quantity of facial images having no corresponding contact names.

Thereafter, the process continues at step S307.

Case 3: Phone Book Image Files Match all of Extracted Facial Images and the Number of the Extracted Facial Images is Greater than a Specified Number If the number of extracted facial images is greater than the specified number, e.g., 3, at step S303, the controller 115 controls the display unit 107 to display contact names corresponding to phone book image files matching all of the extracted facial images and requests that the user select a desired contact name among the displayed contact names through the key input unit 109 (S321).

Figure 4G:
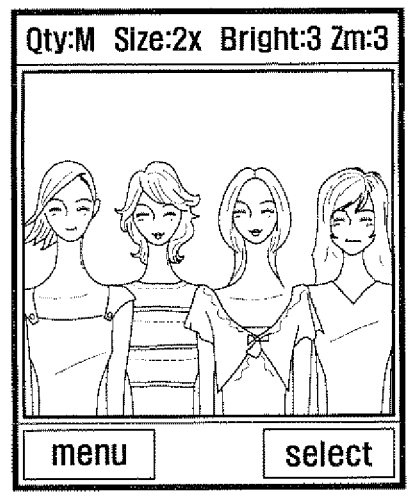
Figure 4H:
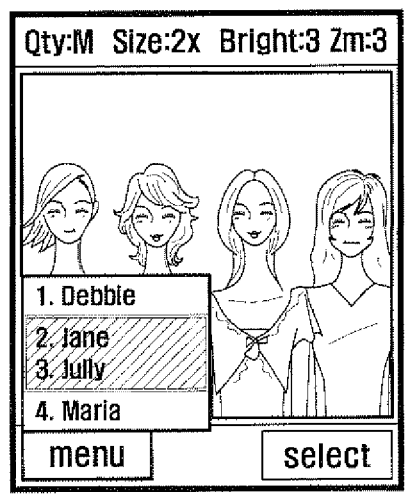

FIG. 4G shows a screen example of the display unit 107 on which an input image file containing four extracted facial images is displayed, and FIG. 4H shows a screen of the display unit 107 that displays contact names corresponding to phone book image files matching the four extracted facial images. If the number of extracted facial images is greater than the specified number, the contact names displayed may include the names of each person appearing in the input image file. Alternatively, the user may select a desired name through the key input unit 109.

Figure 4I:
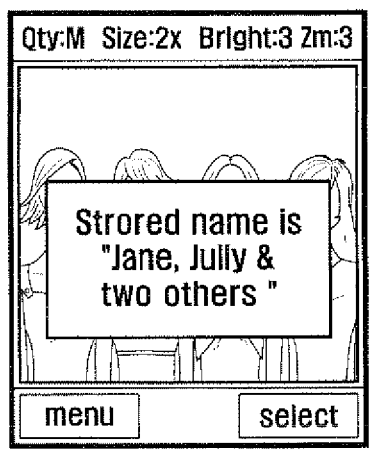

The controller 115 then creates a file name, "(selected contact name) & (the quantity of the selected contact names subtracted from the number of extracted facial images) others" (S323). If contact names "Jane" and "Jully" are selected corresponding to two of the extracted four facial images as shown in FIG. 4H, the created file name is "Jane, Jully & two others" as shown in FIG. 4I.

Subsequently, the process continues at step S307.

Returning to FIG. 2, after steps S209 and S211 of selecting the image file name and storing the input image file are performed in the manner described above, the controller 115 requests that the user decide whether to save the stored input image file in the matching phone book image file (S213). That is, the user may use the image file stored according to the above steps as a phone book image file. If there is no signal to store the image file in the corresponding phone book image file, the controller 115 terminates the process.

If a user requests to store the image file in the corresponding phone book image file, the controller 115 stores a thumbnail image of the input image file in the matching phone book image file (S215). Step S215 is described in detail with reference to FIG. 1, FIG. 2, FIG. 5, and FIG. 6 as follows.

Figure 6A:
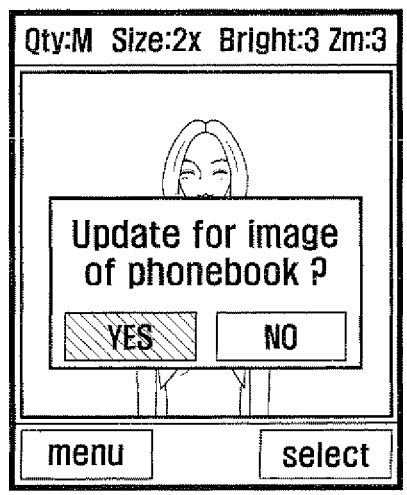
FIG. 6A and FIG. 6B show screen examples of a mobile terminal performing the steps shown in FIG. 5.
Figure 6B:
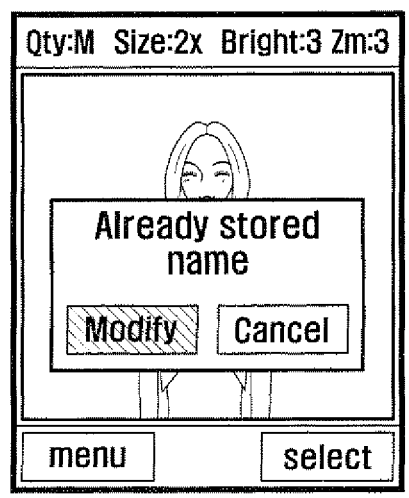

FIG. 5 is a flowchart showing steps according to the method of FIG. 2. FIG. 6A and FIG. 6B show screen examples of a mobile terminal performing the steps shown in FIG. 5.

Referring to FIG. 1, FIG. 2, FIG. 5, and FIG. 6, the controller 115 checks whether one of the contact names for the input image file matching a phone book image file is selected (S501). More specifically, the controller 115 checks whether phone book image files matching the input image file exist at step S207, and the contact names corresponding to the matching phone book image files are displayed and a desired contact name is selected at step S209.

If one of the displayed contact names corresponding to a matching phone book image file is selected, the controller 115 checks whether to record the input image file in the phone book image file associated with the selected contact name (S503). The controller 115 may replace the phone book image file corresponding to the selected contact name with the input image file, according to user selection. FIG. 6A shows an example of a screen requesting whether to record an input image file in a phone book image file for a selected contact name. As shown in FIG. 6A, the controller 115 controls the display unit 107 to display a pop-up window asking the user whether to record the input image file in the phone book 113.

If a signal instructing the controller 115 to register the input image file in the phone book image file associated with the selected contact name is input, the controller 115 records a thumbnail image for the input image file (S505). That is, a thumbnail image file for the input image file stored at step S211 is recorded in the phone book image file for the selected contact name. This thumbnail image file replaces the previously stored phone book image file. Although the thumbnail image for the input image file is recorded in the phone book image file, the input image file stored in the photo album is displayed on the display unit upon making or receiving a call to or from a phone number of a contact whose corresponding thumbnail image is stored in the phone book image file. If, however, a signal instructing the controller 115 to register the input image file in the phone book image file is not input at step S503, the controller 115 performs a function corresponding to the user's request (S509).

If one of the contact names corresponding to the matching phone book image files is not selected at step S501, the controller 115 checks whether the selected contact name exists in the phone book 113 (S507). In this case, a phone book image file matching the input image file does not exist at step S207, and a new file name is input at step S219 because the user has not recorded an image file corresponding to a contact upon registering contact information in the phone book 113. Although an image file corresponding to a contact is not recorded, other contact information about each contact, e.g. name and phone number, may be recorded.

If the selected contact name exists in the phone book 113, the process continues at step S505, and a thumbnail image of the input image file is recorded in the phone book image file corresponding to the selected contact name. FIG. 6B shows a screen indicating that a newly input file name already exists in the phone book 113. As shown in FIG. 6B, if the new file name is contained in the phone book 113, the controller 115 checks whether the user wants to record the input image file in the phone book image file corresponding to the new file name and then performs step S505.

In the above description, still images such as photos may be taken and stored as image files; however, a facial image and feature points may be extracted from a moving image to store the captured moving image using a contact name for a phone book image file matching the moving image. It will also be apparent to those skilled in the art that images other than facial images may be extracted from an input image file to create a file name.

It will be apparent to those skilled in the art that various modifications and variations can be made in the present invention without departing from the spirit or scope of the invention. Thus, it is intended that the present invention cover the modifications and variations of this invention provided they come within the scope of the appended claims and their equivalents.

What is claimed is:

1. A method, using a controller, for storing an image file in a mobile terminal, comprising:
    receiving an input image;
    comparing the received input image with phone book images that correspond to contact names stored in a phone book;
    identifying a number of individuals in the input image;
    comparing the number of individuals to a threshold number,
    automatically creating, in response to a phone book image matching the received input image, a file name for the input image according to a naming convention based on a contact name corresponding to the phone book image, the naming convention being selected from a plurality of naming conventions based on the number of individuals identified in the input image; and
    storing an input image file using the file name corresponding to the input image automatically created by the controller,
    wherein, if the number of individuals is greater than the threshold number, the naming convention is selected as a first naming convention, and
    wherein, if the number of individuals is less than or equal to the threshold number, the naming convention is selected as a second naming convention different from the first naming convention.

2. The method of claim 1, further comprising:
    displaying the contact name for the matching phone book image.

3. The method of claim 1, further comprising:
    replacing the matching phone book image with the input image of the input image file.

4. The method of claim 1, wherein the input image is captured via a camera module.

5. The method of claim 1, wherein the input image is received via a mobile communication network.

6. The method of claim 3, wherein the phone book image is displayed upon making or receiving a call.

7. The method of claim 1, further comprising:
    receiving, in response to no existing matching phone book image, a file name of the input image file;
    comparing the received file name with contact names stored in the phone book; and
    storing, in response to the received file name matching the contact name, the input image file as a phone book image file for a matching contact name.

8. The method of claim 7, wherein the phone book image is displayed upon making or receiving a call.

9. A method, using a controller, for storing an image file in a mobile terminal, comprising:
    receiving an input image;
    identifying a number of individuals in the input image;
    comparing the number of individuals to a threshold number; and
    comparing the received input image with phone book images that correspond to contact names stored in a phone book,
    wherein, in response to a phone book image matching the received input image, the method further comprises:
        automatically creating a file name for the input image according to a naming convention based on a contact name corresponding to the phone book image, the naming convention being selected from a plurality of naming conventions based on the number of individuals identified in the input image;
        storing an input image file using the file name corresponding to the input image automatically created by the controller;
        replacing the matching phone book image with the input image; and
        storing the matching phone book image in the phone book,
    wherein, if the number of individuals is greater than the threshold number, the naming convention is selected as a first naming convention,
    wherein, if the number of individuals is less than or equal to the threshold number, the naming convention is selected as a second naming convention different from the first naming convention, and
    wherein, in response to no phone book image matching the received input image, the method further comprises:
        receiving a user-input file name for the input image;
        comparing the user-input file name with the contact names; and
        storing, in response to the user-input file name matching a contact name of the contact names, an input image file as a phone book image file for the matching contact name.

10. An apparatus to store an image file in a mobile terminal, the apparatus comprising:

a memory comprising a phone book, the phone book comprising phone book images corresponding to contact names in the phone book; and a processor to:

receive a captured image;

identify one or more facial regions in the captured image;

compare each facial region of the one or more facial regions with facial regions in the phone book images to identify at least one individual corresponding to at least one contact name of the contact names in the phone book;

automatically create, in response to identification of one or more individuals, a file name for the input image according to a naming convention based on one or more contact names corresponding to the one or more individuals, the naming convention being selected from a plurality of naming conventions based on a number of the one or more individuals in comparison to a threshold number; and store an image file comprising the file name corresponding to the captured image, wherein, if the number of the one or more individuals is greater than the threshold number, the processor is configured to select the naming convention as a first naming convention, and wherein, if the number of the one or more individuals is less than or equal to the threshold number, the processor is configured to select the naming convention as a second naming convention different from the first naming convention.

11. The apparatus of claim 10, further comprising:

a user interface to receive a file name for the image file, wherein the processor is configured to provide the user interface in response to a failure to identify at least one individual corresponding to at least one contact name of the contact names in the phone book.

12. The apparatus of claim 10, wherein the processor is configured to:

receive, in response to no existing matching phone book image, a file name of the input image file;

compare the received file name with contact names stored in the phone book; and store, in response to the received file name matching the contact name, the input image file as a phone book image file for a matching contact name.

\* \* \* \* \*